United States Patent Office 2,767,033
Patented Oct. 16, 1956

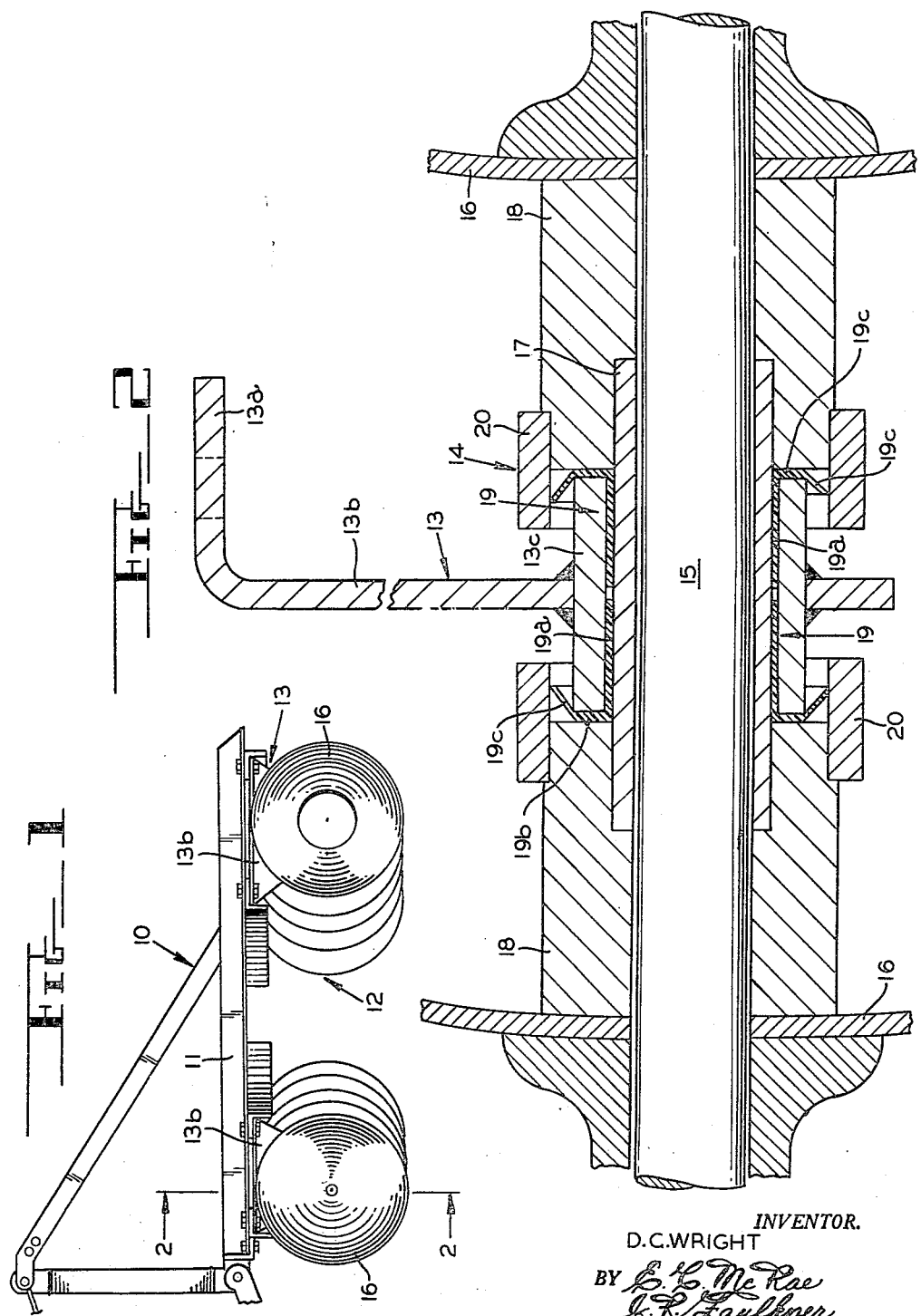

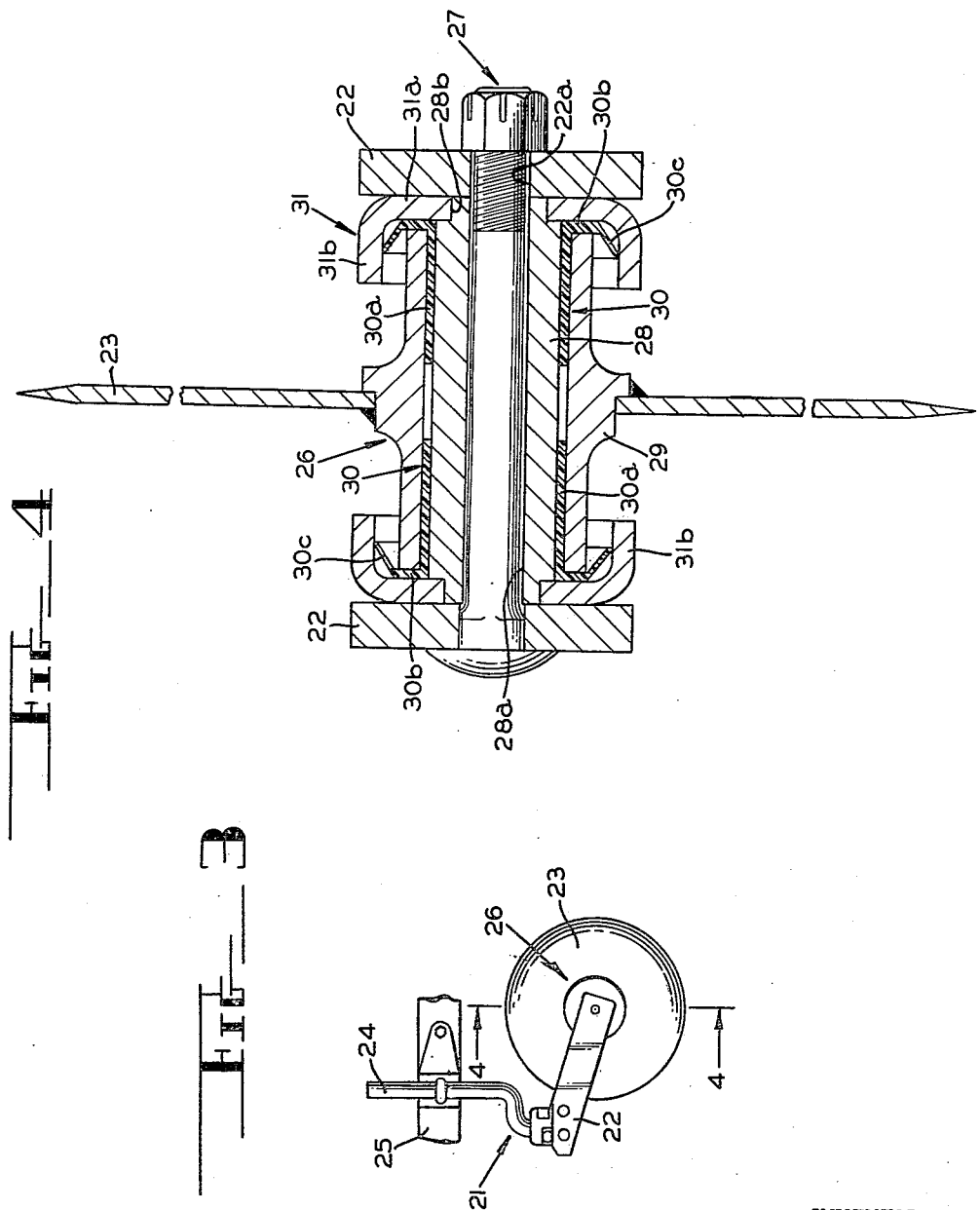

2,767,033

PLASTIC BEARING HAVING AN INTEGRAL DUST SEAL

Dexter C. Wright, Pleasant Ridge, Mich., assignor to Ford Motor Company, Dearborn, Mich., a corporation of Delaware Application November 12, 1953, Serial No. 391,469

4 Claims. (Cl. 308—36.1)

This invention relates to a novel form of antifriction bearing. More specifically this invention relates to an antifriction bearing particularly adapted to use under conditions where dust or abrasive materials are present. In a further aspect this invention relates to a novel bearing structure wherein the bearing member is formed integrally with a dust seal, and the entire unit is fabricated from a so-called "plastic" or resin of synthetic origin.

Farm machinery such as disc harrows, corn pickers, combines and many others are used under field conditions where dust, sand, abrasive soils and the like are present during their operation. These adverse conditions have been found to be very deleterious to antifriction bearings and accordingly it has been found through experiences that dust and abrasive seals must be provided if bearings are to have an appreciable service life. In the past, bearing materials have been made from oil impregnated wood, gray iron, etc., and the well-known ball and roller bearings have also been used. In general, such bearings have required either a felt or rubber seal to prevent the entry of dust, sand and the like into the bearing and also to prevent the loss of lubricant from the bearing. It will be appreciated that when the bearing is of one material and the seal or seals are of another material, many parts will be required in the bearing assembly, with a concomitant high cost of manufacture and assembly.

It is accordingly an object of the present invention to provide a novel bearing structure wherein the bearing and seal are formed as an integral unit.

It is still another object of the present invention to provide a novel bearing unit having an integrally formed dust seal, wherein said bearing unit is formed from a so-called synthetic plastic or resin.

It is a further object of the present invention to provide a novel, one-piece and/or axial thrust, antifriction bearing and integral dust seal.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side view of a disc harrow having the bearing structure of the present invention employed therein.

Figure 2 is an enlarged section view taken along the plane 2—2 of Figure 1, which illustrates in detail an integral bearing and dust seal made according to the present invention.

Figure 3 is a side view of a plow coulter assembly incorporating the present integrally formed bearing and dust seal structure.

Figure 4 is an enlarged section view taken along the plane 4—4 of Figure 3.

As shown on the drawings:

In Figure 1, the numeral 10 refers generally to a disc harrow of conventional construction having a welded steel frame 11 to which a plurality of disc gangs 12 are secured in depending relationship. Each disc gang 12 is attached to the frame 11 by means of a pair of disc gang hangers 13. Each hanger 13 comprises a horizontal top portion 13a which is apertured for bolting to the underside of frame 11, and a depending plate or bracket portion 13b which is apertured at its lower end for the receipt of a bearing sleeve 13c.

As shown in Figure 2, the numeral 14 refers generally to a disc harrow bearing which includes a gang bolt 15 upon which a plurality of spaced earth-working discs 16 are fixedly mounted. An inner bearing sleeve 17 is mounted upon gang bolt 15 and is held in fixed position between a pair of thrust caps 18, which serve to space the discs 16 a fixed distance apart. As previously mentioned each disc gang hanger 13 is apertured at its lower end, and a horizontally disposed, outer bearing sleeve 13c is welded into the said aperture. The inner bearing sleeve 17 is disposed within the outer sleeve, 13c for rotation. A plastic bushing and integral dust seal, made according to the present invention is indicated by numeral 19 and is interposed between the outside diameter of the inner sleeve 17 and the inside diameter of the outer sleeve 13c. Bushing 19 includes a cylindrical portion 19a which absorbs radial thrust, and an integrally formed axial thrust portion 19b extending laterally outwardly to said cylindrical portion 19a, and also an integral, annular, dust seal 19c. Two bushings are used for each bearing installation. Since Figure 2 is a section view of the disc harrow 10, it will be appreciated that the sleeve portion 19a is of cylindrical configuration and the axial thrust portion 19b is a disc-like ring. The dust seal 19c is integrally formed with the thrust section 19b and extends radially outwardly and rearwardly therefrom as a disc-like projection of uniform diameter.

A cylindrical seal guard 20 is fitted on each of the thrust caps 18. Each seal guard 20 is spaced radially outwardly a short distance from the outer sleeve 13c. The disc-like dust seal 19c of the plastic bushing unit 19 is formed of sufficiently large outside diameter that during the assembly of bearing 14, the periphery of seal 19c is compressed slightly by the inner surface of seal guard 20. Thus a firm contact is established between seal 19c and the inside of seal guard 20 to prevent dust, dirt, sand and other foreign substances from entering, and lubricant, if used, from being lost from the bearing structure 14. In the bearing shown in Figure 2, two of the sleeve and dust guard units 19 are employed, one at each end of the bearing. Thus a two-directional, axial thrust bearing is provided. As shown the integral bushing and seal units 19 are mirror images of each other.

Another typical application for the integral bearing and dust seal of the present invention is shown in Figures 3 and 4. In these figures, the present bearing and seal is illustrated as applied to a plow coulter 21. The coulter assembly 21 includes a fork 22 upon which a coulter disc 23 is rotatably supported by means of a bearing indicated at 26. The bight portion of fork 22 is apertured, whereby said fork is rotatably supported on a vertical coulter stem 24. The coulter stem 24 is secured at its upper end to a plow beam 25 in a conventional manner.

As shown in Figure 4, the bifurcated ends of the fork 22 are provided with transversely aligned apertures 22a for the receipt of a carriage bolt 27, upon which the coulter bearing 26 is mounted. Bearing assembly 26 includes an inner bearing sleeve 28 which is longitudinally apertured as at 28a to snugly fit over the shank of carriage bolt 27. An outer bearing sleeve 29 is fitted over the inner sleeve 28 for rotation. A centrally apertured coulter disc 23 is mounted upon the outer sleeve 29, as by welding. A pair of plastic bushing and integral dust seal units 30 are interposed between the outside diameter of the inner bearing sleeve 28 and the inside diameter of the outer sleeve 29. The bushing and integral dust seal units 30, as previously described, include a cylindrical, radial thrust portion 30a and an integrally formed axial thrust disc 30b, and also an integral annular dust seal 30c. Thrust cap and seal guards 31, which are centrally apertured, are fitted upon reduced diameter shoulder portions 28b formed on the ends of the inner bearing sleeve 28. As shown each thrust cap and seal guard 31 includes a disc-like thrust washer portion 31a and an integrally formed cylindrical seal guard portion 31b, formed on the periphery of the thrust disc 31a. The cylindrical seal guard portion 31b is spaced radially outward from the outside diameter of the outer bearing sleeve 29 to accommodate the seal 30c. The dust seal portion 30c is formed of sufficiently large outside diameter that it is slightly compressed by the inner surface of the seal guard 31b to provide a firm and dustproof seal.

This invention contemplates the use of plastic materials of the synthetic linear condensation product type, which have suitable friction characteristics as well as sufficient resilience to provide the sealing function. Of special applicability is that polyamide-type plastic derived as a reaction product of hexamethylenediamine and adipic acid. Such a material is known to the trade as "nylon." It has been recognized that polyamides of the type above mentioned have such frictional characteristics that, for certain bearing purposes, they do not require lubrication. Also to be included within the scope of the present invention are plastics of the type of polyvinyl chloride and others which have favorable antifriction characteristics, as well as sufficient resiliency to provide a resilient dust seal as contemplated in the present construction. It will, of course, be understood that various lubricants are to be included as useable with the present bearings and these include lubricants of the dry type such as graphite, molybdenum disulfide and the like. Also, the so-called greases, which include the petroleum hydrocarbon lubricants or the more recently developed silicones and fluorocarbon compounds can be used as lubricants with the present bearing structures. Of course, it will be realized that the lubricants employed must be limited to materials which will not cause deterioration of the plastics from which the present bearings are fabricated.

The present bearings can be made advantageously by injection molding methods, since their configuration readily enables them to be removed from injection molding machines. Of course, it will be obvious to those skilled in the art that the present integrally formed bearing and seal structures can be turned from solid stock or fabricated in any other suitable manner desired.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A bearing assembly, comprising an inner bearing member and an outer bearing sleeve, said member and sleeve having confronting, coaxial, radially spaced, cylindrical bearing surfaces, the bearing member having a flat, radially outwardly extending thrust surface adjacent a similar surface on an end of the sleeve, and the bearing member having a generally cylindrical dust guard portion overlying the thrust surface end of the bearing sleeve; and a plastic antifriction bushing and dust seal having a load-bearing cylindrical portion lying between the bearing member and sleeve and a generally flat, circular end flange projecting radially outwardly between the bearing member and sleeve for providing a thrust bearing and terminating in a resilient peripheral edge biased against the inner surface of the dust guard portion to form a seal preventing entry of foreign mater into the bearing assembly.

2. A bearing assembly, comprising an inner bearing member and an outer bearing sleeve, said member and sleeve having confronting, coaxial, radially spaced, cylindrical bearing surfaces, the bearing member having a flat, radially outwardly extending thrust surface adjacent a similar surface on each end of the sleeve, and the bearing member having a generally cylindrical dust guard portion overlying each end of the bearing sleeve; and a pair of combined plastic antifriction bushings and dust seals each having a load-bearing cylindrical portion lying between the bearing member and sleeve and a generally flat, circular end flange projecting radially outwardly between the bearing member and sleeve for providing thrust bearings, the flange of each combined bearing and dust seal terminating in a resilient peripheral edge biased against the inner surface of the adjacent dust guard portion to form a seal preventing entry of foreign matter into the bearing assembly.

3. A bearing assembly, comprising an inner bearing member and an outer bearing sleeve, said member and sleeve having confronting, coaxial, radially spaced, cylindrical bearing surfaces, the bearing member having a generally cylindrical dust guard portion overlying an end of the bearing sleeve; and a plastic antifriction bushing and dust seal having a load-bearing cylindrical portion lying between the bearing member and sleeve and a generally flat, circular end flange projecting radially outwardly beyond the sleeve and terminating in a resilient peripheral edge biased against the inner surface of the dust guard portion to form a seal preventing entry of foreign matter into the bearing assembly.

4. A bearing assembly, comprising an inner bearing member and an outer bearing sleeve, said member and sleeve having confronting, coaxial, radially spaced, cylindrical bearing surfaces, the bearing member having a generally cylindrical dust guard portion overlying each end of the bearing sleeve; and a pair of combined plastic antifriction bushings and dust seals, each having a load-bearing cylindrical portion lying between the bearing member and sleeve and a generally flat, circular end flange projecting radially outwardly beyond the sleeve and terminating in a resilient peripheral edge biased against the inner surface of the adjacent dust guard portion to form a seal preventing entry of foreign matter into the bearing assembly.

References Cited in the file of this patent

UNITED STATES PATENTS

| Re. 21,145 | Goble | July 11, 1939 |
| 1,428,267 | Soldane et al. | Sept. 5, 1922 |
| 1,821,774 | Strandlund | Sept. 1, 1931 |
| 1,931,724 | Fageol et al. | Oct. 24, 1933 |
| 2,161,003 | Berman | June 6, 1939 |
| 2,520,092 | Frederickson et al. | Aug. 22, 1950 |
| 2,565,701 | Stewart | Aug. 28, 1951 |
| 2,626,839 | Creson et al. | Jan. 27, 1953 |